United States Patent [19]
Petershack

[11] 3,782,527
[45] Jan. 1, 1974

[54] CLIPPED-DISC DEVICE FOR RIGHT-ANGLE TRANSFER

[75] Inventor: Victor D. Petershack, Ellwood City, Pa.

[73] Assignee: Rex Chainbelt Inc., Milwaukee, Wis.

[22] Filed: Jan. 17, 1973

[21] Appl. No.: 324,268

[52] U.S. Cl. ............... 198/25, 193/35 SS, 193/36, 198/127 R, 214/84
[51] Int. Cl. ........................................... B65g 47/00
[58] Field of Search ................. 198/129 R, 33 AA, 198/105, 25; 193/35 R, 35 MD, 36, 35 SS; 214/84

[56] References Cited
UNITED STATES PATENTS
1,549,499   8/1925   Parker ........................... 193/35 MD FOREIGN PATENTS OR APPLICATIONS
401,975   11/1933   Great Britain .................... 198/127

OTHER PUBLICATIONS
Automation Oct. 1971 Cleveland Ohio, Penton Pub. Co., p. 11, "Right Angle Transfer Unit Built From Clipped Discs" TJ 212 A9

Primary Examiner—Richard E. Aegerter
Assistant Examiner—Douglas D. Watts
Attorney—Richard C. Sughrue et al.

[57] ABSTRACT

A device for selectively transfering items on one roller conveyer to another conveyer set at a right-angle to the first conveyer. The device comprises a plurality of clippped discs and associated pie-shaped slave segments set between the rollers of the first conveyer and mounted for rotation at a right angle thereto. The discs and slave segments are mounted at a height such that when they are at rest, with the clipped surfaces of the discs up, they are below the surface of the rollers. When the discs are rotated, however, the circular portions of the discs protrude above the surface of the rollers, and a pin mounted on each disc causes the slave segments to rotate with the discs in angular relation such that the periphery of the pie-shaped slave segments completes the circular surface of the clipped discs, allowing the items to be moved at a right angle to the first conveyer without contacting the rollers thereof.

3 Claims, 5 Drawing Figures

PATENTED JAN 1 1974  3,782,527
FIG.1
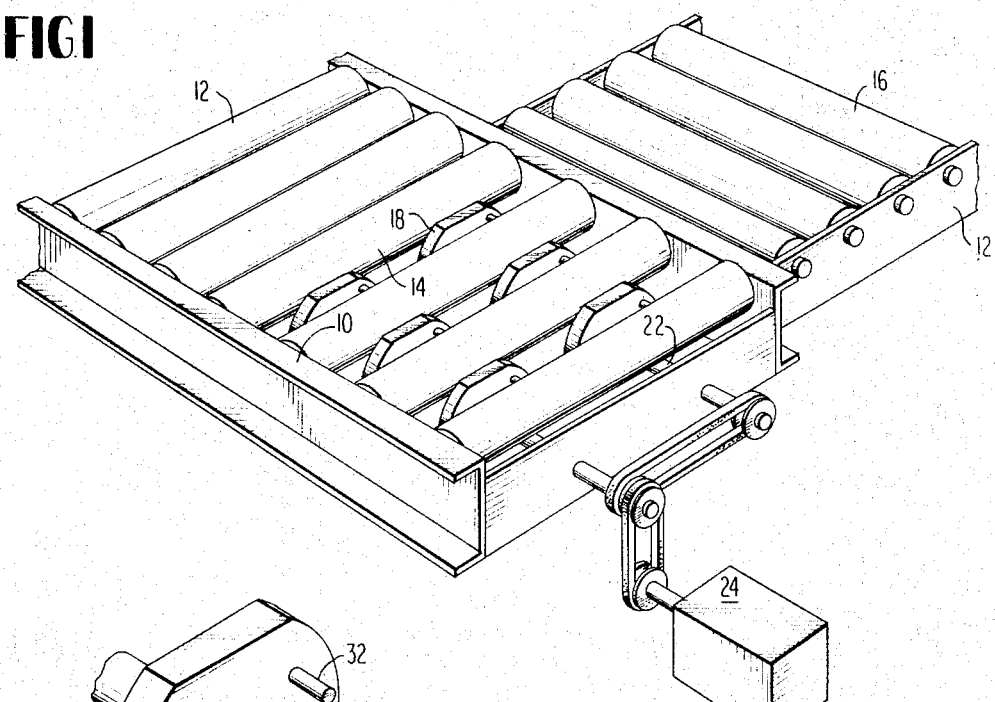
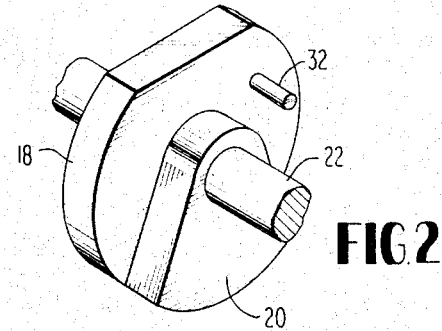
FIG.2
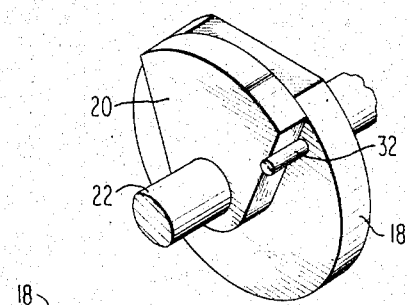
FIG.3
FIG.4
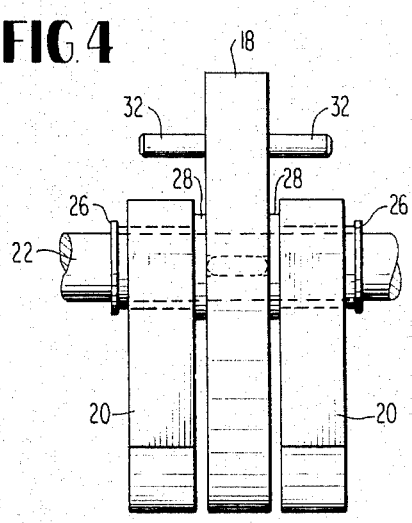
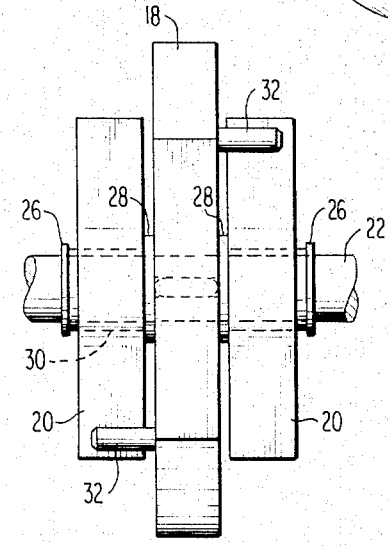
FIG.5 ice at rest.
CLIPPED-DISC DEVICE FOR RIGHT-ANGLE TRANSFER

BACKGROUND OF THE INVENTION

1. Field of the Invention

This invention relates generally to conveyers for transporting individual items, such as boxes. In particular, it relates to conveyers of the type composed of a plurality of rollers set at spaced intervals.

2. Description of the Prior Art

It is often required to selectively transfer items moving on a conveyer in one direction to another conveyer moving at a right angle to the first conveyer. Various solutions to this problem have been proposed, including one, illustrated at page 11 of the magazine *Automation* for October 1971, employing clipped discs. However, the clipped-disc device illustrated in *Automation* is subject to the objection that the clipped portions of the disc peripheries come up on each revolution of the discs, allowing any item being conveyed by the discs to come into contact with the rollers at that point whether or not that is desirable. The present invention is designed to overcome this objection by allowing the discs to present a continuous circular profile to the article to be transferred.

SUMMARY OF THE INVENTION

A device for selectively transfering items on one roller conveyer to another conveyer set at a right-angle to the first conveyer. The device comprises a plurality of clipped discs and associated pie-shaped slave segments set between the rollers of the first conveyer and mounted for rotation at a right angle thereto. The discs and slave segments are mounted at a height such that when they are at rest, with the clipped surfaces of the discs up, they are below the surface of the rollers. When the discs are rotated, however, the circular portions of the discs protrude above the surface of the rollers, and a pin mounted on each disc causes the slave segments to rotate with the discs in angular relation such that the periphery of the pie-shaped slave segments complete the circular surface of the clipped discs, allowing the items to be moved at a right angle to the first conveyer without contacting the rollers thereof.

BRIEF DESCRIPTION OF THE DRAWINGS

FIG. 1 is a perspective view of a device made according to the present invention.

FIG. 2 is a perspective view of a portion of such a device at rest.

FIG. 3 is a perspective view of a portion of such a device in operation.

FIG. 4 is a plan view of the fragment shown in FIG. 3.

FIG. 5 is a front view of the fragment shown in FIG. 3.

DETAILED DESCRIPTION OF A PREFERRED EMBODIMENT

FIG. 1 shows a portion of a conventional roller conveyer 10 at which it is desired to selectively transfer items to another conveyer 12 set at a right angle to the first conveyer. For the sake of clarity, adjacent portions of the first conveyer have been omitted. However, it should be understood that, if not all items are to be transferred from the conveyer 10 to the conveyer 12, the rollers 14 of the conveyer 10 would normally be continued to the right in FIG. 1. These rollers, as well as the rollers 16 of the conveyer 12, are powered by any appropriate means, and such powering forms no part of the present invention.

Set between the rollers 14 of the conveyer 10 at the junction of the conveyers are a plurality of clipped discs 18 and associated pie-shaped slave segments 20. Both the discs and the slave segments are mounted on shafts 22 which pass beneath the rollers 14. The shafts 22 are adapted for selective clockwise or counterclockwise rotation in response to actuation of the motor 24. Clockwise rotation of the shafts 22 causes items on the conveyer 10 to be transferred to the conveyer 12, while counterclockwise rotation causes such items to be transferred to a similar conveyer, omitted for the sake of clarity, on the other side of the conveyer 10. As may be seen most clearly in FIGS. 4 and 5, the clipped discs 18 are keyed to the shafts 22, but the slave segments 20, while kept in position laterally by retainers 26 and 28, are free to rotate on bushings 30.

The size of the discs 18 and the portion clipped from each one are such that when they are at rest, with their clipped surfaces up, they are slightly below the surface of the roller 14. When the discs 18 are rotated, however, the circular portions of the discs are brought uppermost, and this part of the discs protrudes above the surface of the rollers.

As the device has been described so far, an item moving along the first conveyer 10 could be picked up by the discs 18 and moved laterally a distance equal to the circumference of the discs minus the clipped out portion thereof. When the clipped portion was again uppermost, however, the item would be deposited on the rollers 14 and would continue to the right in FIG. 1 until the circular peripheries of the discs represented themselves. It is the function of the pie-shaped slave segments 20 to avoid this undersirable result.

A pin 32 is mounted on each side of the clipped disc 18 at a point just behind the clipping in the direction of rotation of the disc. (Thus, one pin is on one side of the clipping and the other pin is on the other side, as best seen in FIG. 4.) These pins contact the side of the freely rotatable pie-shaped slave segments 20, causing them to rotate with the clipped discs. This effect is best seen in FIGS. 2 and 3. In FIG. 2, the device is at rest, with the clipped portion of the disc 18 uppermost and the slave segment 20 hanging down. When, however, the shaft 22 is actuated in a counterclockwise direction, the pin 32 will come into contact with the left-hand side of the segment, forcing it to rotate with the disc in an angular relation such that its periphery completes the circular surface of the disc, allowing any items in the junction area to be moved at a right angle to the first conveyer without contacting the rollers thereof. The actuation of the shaft 22 can be by manual control or by any appropriate upstream sensing device, many forms of which are well known in the art.

When the transfer of the item to the convery 12 is completed, rotation of the shafts 22 is stopped. The discs may then be allowed to return to their rest position naturally due to their eccentric construction, or they may be positively returned to that position by any appropriate construction. In either case, however, the slave segments 20 are returned to their rest positions by gravity.

It should be noted that where right-angle transfer in one direction only is requred, only slave segment is needed with each disc rather than the two which have been shown.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. In a clipped-disc device for transfering items on one roller conveyer to one or two conveyers set at right angles to said roller conveyer in the same plane as said roller conveyer, said clipped-disc device comprising a plurality of clipped discs set between the rollers of said roller conveyer and mounted on shafts for rotation at at right angle thereto, the improvement comprising:

an eccentric slave segment mounted for free roation on said shafts adjacent to each of said clipped discs, said eccentric slave segment having a circular periphery which is equal in radius to the circular portion of said clipped disc ant at least substantially equal in length to the clipped portion of said clipped disc, and a pin mounted on each of said clipped discs at a point just behind the clipped portion of said clipped disc in the direction of rotation of the disc, said pin being of sufficient length to contact the side of the adjacent slave segment, whereby rotation of said clipped discs causes said eccentric slave segments to rotate with said clipped discs in an angular relation therewith such that the circular peripheries of said slave segments complete the circular peripheries of the discs.

2. A clipped-disc device such as is claimed in claim 1 wherein two eccentric slave segments are associated with each of said clipped discs, one on each side thereof, and two pins are mounted on each of said clipped discs, one on each side thereof and one at each end of the clipped portion of said clipped disc, whereby said clipped-disc device may be used to selectively transfer items from said roller conveyer in eother direction perpendicular thereto in the same plane.

3. A clipped-disc device such as is claimed in claim 1 wherein said eccentric slave segments are kept in spaced relation to said clipped discs by retainers, but are free to rotate on bushings.

* * * * *